United States Patent
Hanford et al.

[19]

[11] Patent Number: 6,126,824
[45] Date of Patent: Oct. 3, 2000

[54] SCUM REMOVAL SYSTEM FOR LIQUID TREATMENT TANK

[75] Inventors: Robert E. Hanford, Murray; Peter J. Bsumek, Salt Lake City; William C. Stewart, Murray, all of Utah

[73] Assignee: Baker Hughes Incorporated, Houston, Tex.

[21] Appl. No.: 09/172,833

[22] Filed: Oct. 15, 1998

Related U.S. Application Data

[60] Provisional application No. 60/062,301, Oct. 17, 1997.

[51] Int. Cl.⁷ ........................................ C02F 1/40
[52] U.S. Cl. .............. 210/242.3; 210/527; 210/530; 210/538; 210/540; 210/776
[58] Field of Search .................... 210/527, 528, 210/530, 538, 540, 776, 523, 525, 242.1, 242.3

[56] References Cited

U.S. PATENT DOCUMENTS

| | | |
|---|---|---|
| 3,579,904 | 5/1971 | Genin . |
| 3,898,162 | 8/1975 | Carlson et al. ............... 210/170 |
| 3,919,090 | 11/1975 | Shaffer ........................ 210/523 |
| 3,977,974 | 8/1976 | Pelton ........................ 210/195 S |
| 4,011,164 | 3/1977 | McGivern ................... 210/242 R |
| 4,054,520 | 10/1977 | McGivern . |
| 4,089,178 | 5/1978 | Kinase et al. ............. 210/DIG. 25 |
| 4,290,887 | 9/1981 | Brown ...................... 210/242.1 |
| 4,462,909 | 7/1984 | Kennel . |
| 4,594,156 | 6/1986 | Grujanac et al. ............. 210/145 |
| 4,693,821 | 9/1987 | Goronszy et al. ............. 210/241 |
| 4,891,128 | 1/1990 | Goronszy . |
| 6,015,501 | 1/2000 | Lundback ..................... 210/776 |

FOREIGN PATENT DOCUMENTS

| | | |
|---|---|---|
| 3627119 A1 | 2/1988 | Germany . |
| 8-132035 | 5/1996 | Japan . |
| 2529918 | 6/1996 | Japan . |
| 430854 | 5/1936 | United Kingdom . |
| 1424934 | 2/1976 | United Kingdom . |
| 2 257 639 | 1/1993 | United Kingdom . |

Primary Examiner—Chester T. Barry
Attorney, Agent, or Firm—R. Neil Sudol; Henry Coleman

[57] ABSTRACT

A scum removal system for a sewage treatment or clarification tank having a feedwell or skimmer flight includes a scum trough disposed within the settling tank. A floating weir is disposed proximate to the scum trough. A membrane or sheet is partially wrapped or wound about the weir, at least one cable being connected to the membrane for pulling the membrane and concomitantly lowering the weir entrained therewith to permit surface scum to enter the trough from the settling tank. A mechanism for exerting increased tension on the cable to thereby lower the weir below the surface of the liquid in the clarification tank includes a camming lever or arm and an actuator. The lever is connected to the cable, while the actuator is mounted to the feedwell or a skimmer wiper arm so as to engage the camming lever and pivot the actuator lever about an axis. The pivoting of the actuator lever increases tension on the cable and causes the cable to pull the floating weir down in opposition to buoyancy forces tending to drive the weir upwards.

14 Claims, 10 Drawing Sheets

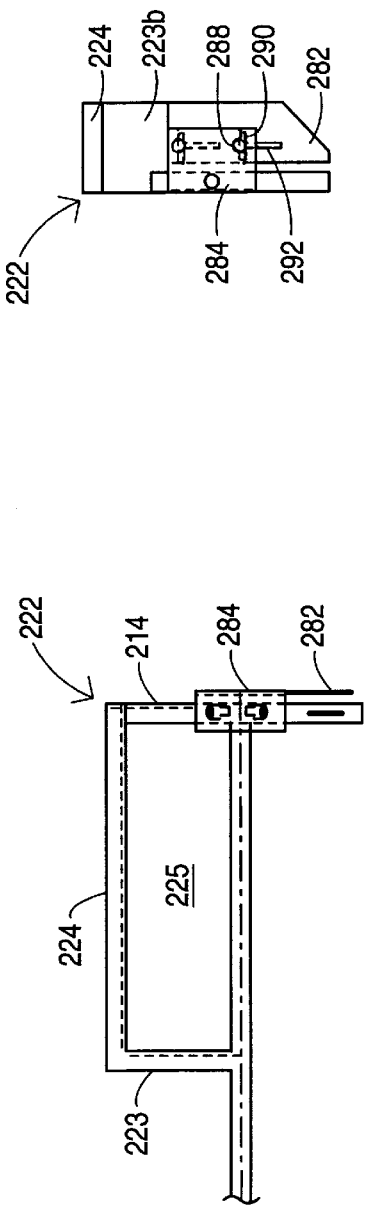
FIG. 13
FIG. 12
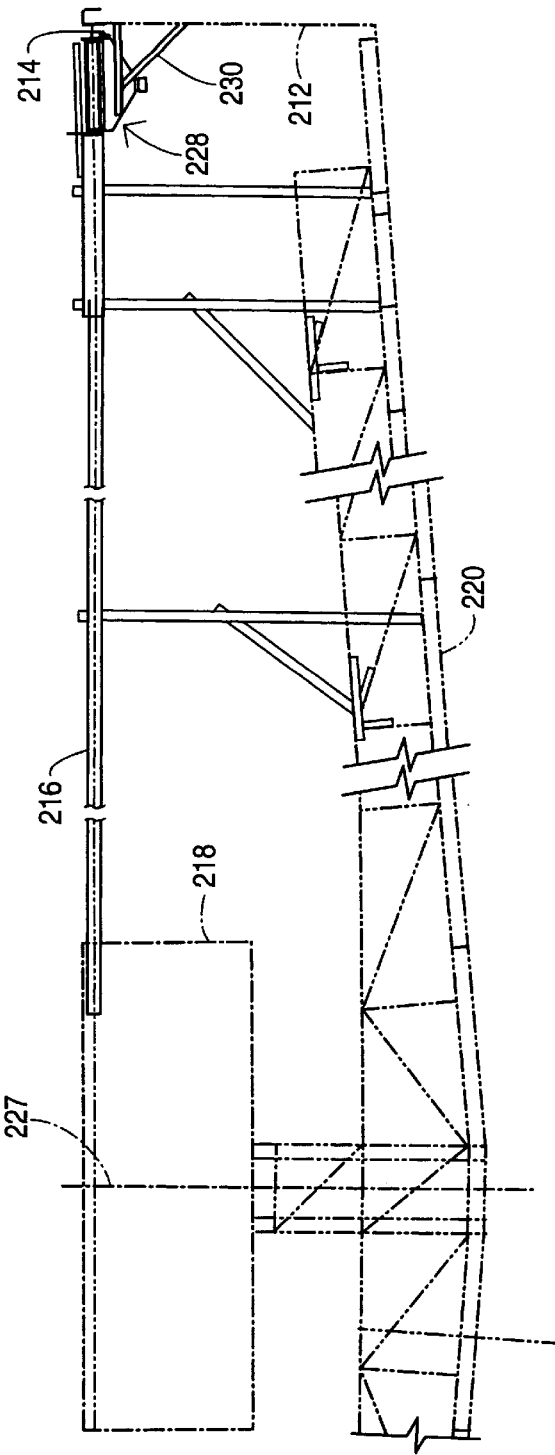
FIG. 14

SCUM REMOVAL SYSTEM FOR LIQUID TREATMENT TANK

CROSS-REFERENCE TO A RELATED APPLICATION

This application relies for priority purposes on U.S. provisional application Ser. No. 60/062,301 filed Oct. 17, 1997.

BACKGROUND OF THE INVENTION

This invention relates to sedimentation apparatus. More specifically, this invention relates to a system for removing surface scum from a liquid treatment tank such as a sewage clarification tank.

In sewage treatment plants, waste is fed to clarification tanks. Denser solids in the sewage settle to the bottoms of the tanks. In the course of treatment, a layers of lighter solids accumulates on the top of a substantially liquid body undergoing treatment. This layer of scum varies in composition and thickness.

Present scum removal systems have inherent problems regarding maintenance and efficiency. Associated factors include varying liquid levels in the tanks, ice build up in cold climates, and extreme variations in the density and depth of the surface film.

In one prior kind of scum removal system, a wiper or skimmer is moved across the surface of the liquid to push the floating materials towards a scum trough which guides the scum away from the clarification tank. The skimmer may take the form of a floating boom, such as disclosed in U.S. Pat. No. 4,054,520 to McGivern. In the scum removal system of that patent, the floating skimmer boom is urged across the surface of the liquid by a carriage towards a floating beach fixed to an upper edge of the scum trough. A roller mounted to the carriage assembly and disposed forwardly of the skimmer boom engages a leading portion of the floating beach and forces the beach downwardly, thereby permitting the scum layer which is caught between the skimmer boom and the beach to wash over the beach into the scum trough. Upon reaching the end of its cleaning stroke, the skimmer boom is pushed up a ramp onto a saddle on the carriage, where the skimmer boom remains until the carriage has returned to a starting position. With a retreat of the carriage away from the scum trough, the beach is freed to resume its upper position, blocking entry of further liquid and surface scum into the scum trough. Upon the return of carriage to its starting position, which is spaced from the scum trough, the skimmer boom is pushed from the saddle back onto the liquid surface for another approach towards the beach.

SUMMARY OF THE INVENTION

The present invention is directed to a scum removal system for a liquid treatment tank. The scum removal system includes a weir which automatically adjusts to the varying liquid level in the tank. The weir is disposed proximate to a scum trough, for example, along a side of the trough. Upon approach of a skimmer wiper arm, the weir automatically drops down, allowing surface scum to flow into the trough. This removal of scum from the surface of the liquid in the clarification tank is accomplished solely by the action of gravity. No scum is pulled up ramps by mechanical skimmers. The depth of the weir travel below the surface of the liquid is adjustable to permit constant or a continuously varying submergence throughout a dipping cycle. The weir dipping duration is also adjustable, permitting starting and terminating the dipping cycle to suit individual operation requirements. After a wiper has swept trapped scum into the trough, the floating weir will resurface to block further flow until the next cycle.

Accordingly, in one embodiment of the present invention, a sewage treatment system comprises a settling tank, a scum trough in the tank, a weir disposed in the tank proximate to the scum trough, and a skimmer wiper arm movably disposed in the tank for periodically sweeping scum toward the trough. The weir includes a floating member and a membrane or sheet partially wrapped around the floating member.

The membrane or sheet is fastened along one side to the scum trough and connected along an opposite side to a tensioning device. The tensioning device may include at least one cable and a mechanism for exerting tension on the cable to pull downwardly on the membrane and concomitantly lower the weir in opposition to buoyancy forces tending to force the weir to the surface of the liquid in the tank.

In accordance with another feature of the present invention, the tension-exerting mechanism has adjustable elements for varying a characteristic of the dipping cycle, such as a duration of weir lowering, a lowest depth to which the weir is lowered, and a rate of submergence of the weir.

In accordance with a more specific feature of the invention, the tension-exerting mechanism includes a camming mechanism, with the adjustable elements being camming elements. The camming elements may include a camming lever on the trough and may further include an adjustable actuator mounted to the skimmer wiper arm to vary a duration of contact between the actuator and the camming lever, thereby varying a duration of displacement of the weir during the dipping cycle. The actuator may take the form of a plate having an adjustable angle of attachment to the skimmer wiper arm.

Where the skimmer wiper arm is attached to a feedwell disposed in the tank, the actuator may be attached to the feedwell and accordingly to the skimmer wiper arm. In this case, the scum trough preferably extends radially from a wall or baffle of the tank to the feedwell and the camming lever is attached to an inner end of the scum trough. Alternatively, where the scum trough extends partially into the tank from the wall or baffle thereof, the actuator is attached to an outer end of the skimmer wiper arm, while the camming lever is attached to tank wall or baffle at the outer end of the scum trough.

In another specific embodiment of the present invention, a scum removal system for a sewage treatment or clarification tank having a skimmer flight comprises, in accordance with the present invention, a scum trough disposed within the settling tank, a floating weir disposed proximate to the scum trough, and at least one cable member connected to the weir for pulling the weir downward to permit surface scum to enter the trough from the settling tank. A mechanism for exerting increased tension on the cable to thereby lower the weir below the surface of the liquid in the clarification tank includes a camming lever or arm and an actuator. The lever is connected to the cable, while the actuator is mounted to the skimmer flight so as to engage the camming lever and pivot the lever about an axis. The pivoting of the camming lever or arm increases tension on the cable and causes the cable to pull the floating weir down in opposition to buoyancy forces tending to drive the weir upwards.

The cable is fastened to the lever or actuator arm on one side of the pivot axis. An opposite side of the lever or actuator arm is formed with a camming surface which engages the actuator on the feedwell or skimmer flight. Also, that portion of the lever or actuator arm disposed on the side of the pivot axis opposite the cable connection is designed to act as a counterweight for maintaining cable tension when the weir is floating in place at the mouth of the scum trough. Preferably, the counterweight portion of the lever or actuator arm is heavy which enables the lever or actuator arm to assume a compact configuration. However, the counterbalancing effect may be achieved alternatively by provided an extended lever arm.

The depth to which the weir is pulled during a dipping cycle is determined by the vertical position of the actuator on the feedwell or skimmer flight. This actuator may take the form of a plate. Where the camming surface of the lever or actuator arm is pushed down (thereby pulling up on the cable) to lower the weir, a lower position of the actuator plate results in a lower dipping of the weir. The duration of the weir's displacement during a dipping cycle is determined partially by the angular velocity of the feedwell or skimmer flight and also by the effective circumferential extent of the actuator plate. By "effective circumferential extent" is meant that length of the actuator plate which is low enough to contact the lever or actuator arm during a revolution of the feedwell about its vertical axis. The effective circumferential extent of the actuator plate may be varied by inclining the plate relative to the horizontal. Inclining the actuator plate also varies the depth to which the weir is displaced during different portions of a dipping cycle. If, for example, the leading edge of the actuator plate is higher than the trailing edge, the weir is displaced an ever increasing amount during a dipping cycle. Of course, the actual motion of the weir is determined by the contour of the camming surface of the lever or actuator arm and by the contour of the actuator plate.

In accordance with a feature of the present invention, the cable extends along a U-shaped path from the weir to the one end of the lever or actuator arm. The cable is preferably supported in elbow guide tubes along the curves of the U-shaped path. Alternatively, pulleys may be used.

BRIEF DESCRIPTION OF THE DRAWINGS

FIG. 12 is a top plan view of the skimmer arm of FIG. 11.

FIG. 13 is a side view of the skimmer arm of FIGS. 11 and 12.

FIG. 14 is a side elevational view of the feedwell, the skimmer arm, and the scum trough of FIG. 11.

DESCRIPTION OF THE PREFERRED EMBODIMENTS

Figure 1:
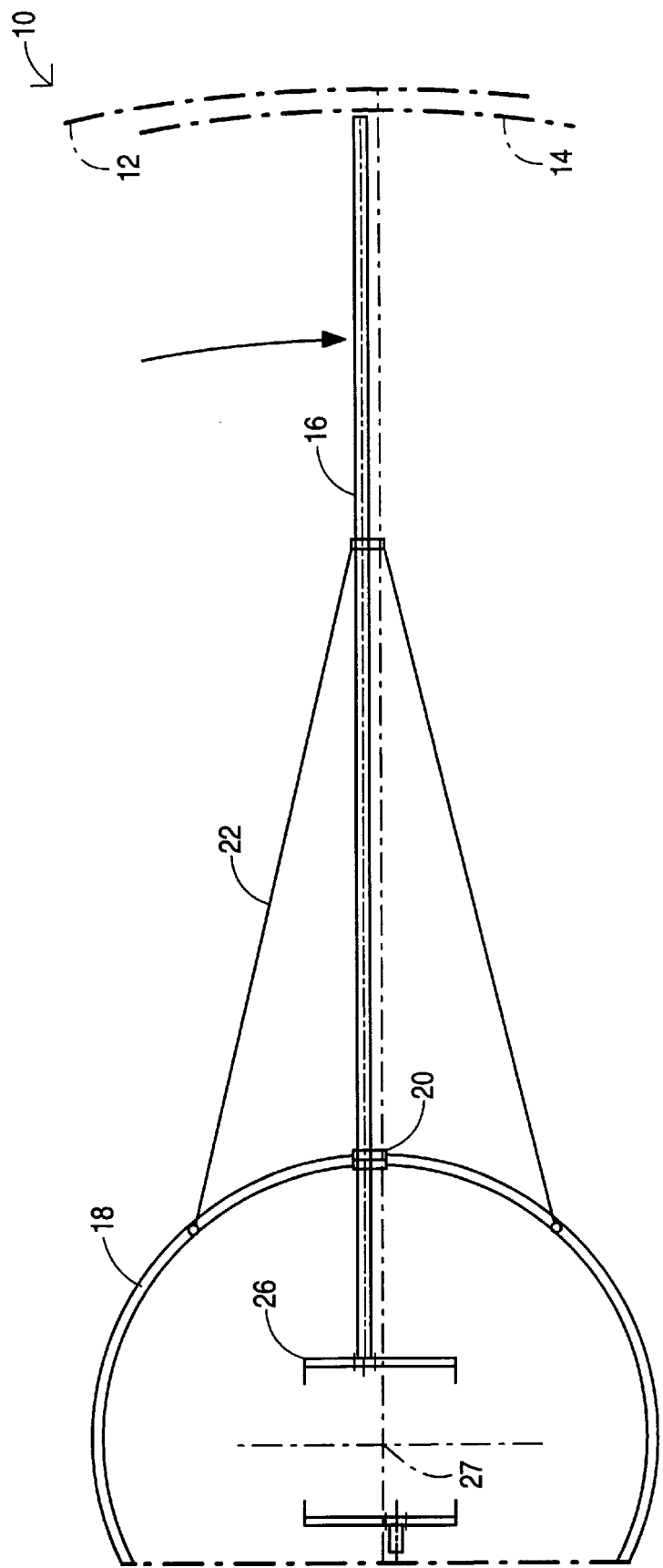
FIG. 1 is a partial top view of a feedwell and a skimmer arm or flight in a clarification tank having a scum removal system in accordance with the present invention.

As illustrated in FIG. 1, a cylindrical clarification tank 10 with an outer tank wall 12 and an inside baffle 14 has a scum removal system which includes a skimmer arm 16. Skimmer arm 16 is mounted to a feedwell 18 via a rim angle 20 of the feedwell and is supported in a radial orientation by tension rods 22 and 24 connected to the feedwell. At an inner end, skimmer arm 16 is connected to a schematically represented drive cage 26 which rotates feedwell 18 and skimmer arm 16 about a vertical axis 27 during a sewage treatment process.

Figure 2:
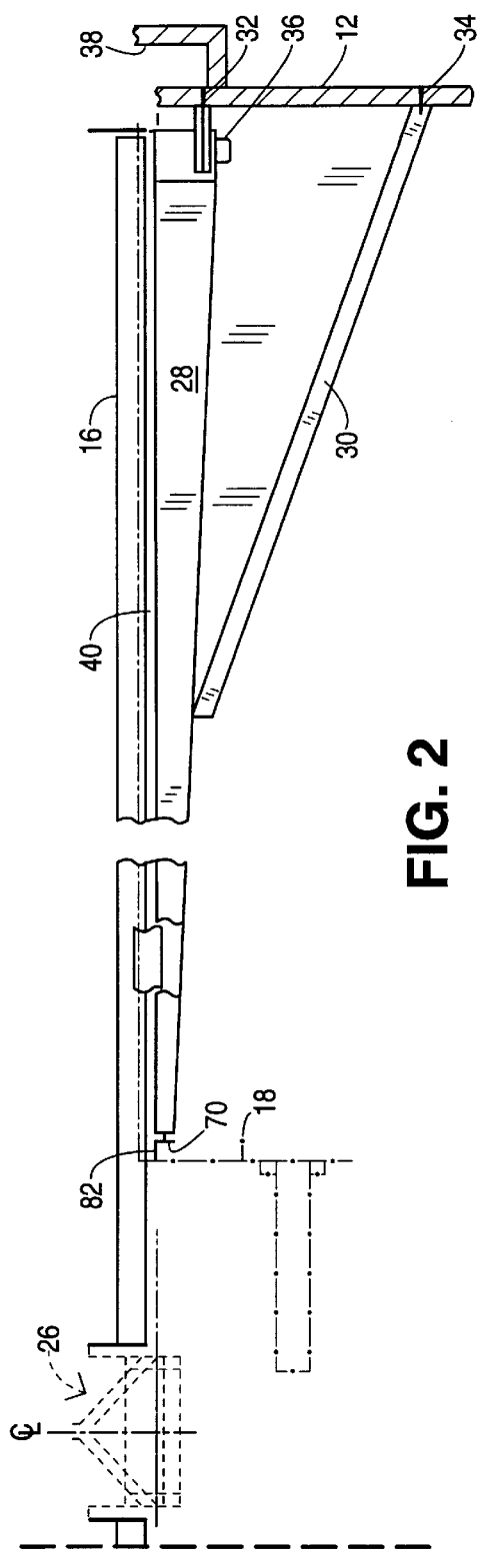
FIG. 2 is a partial rear elevational view of a scum trough in a scum removal system in accordance with the present invention, showing the skimmer arm of FIG. 1 and, in phantom lines, other portions of the scum removal system.

FIG. 2 depicts a scum trough 28 which extends radially inwardly from tank wall 12 and is supported thereon via a bracket arm 30. Scum trough 28 and bracket arm 30 are connected to outer wall 12 via cinch anchors 32 and 34. Trough 28 forms part of the scum removal system and is provided at an outer end with a scum pipe port or connector 36. Tank wall 12 is provided in a region about the outer end of scum trough 28 with an external launder 38.

Figure 3:
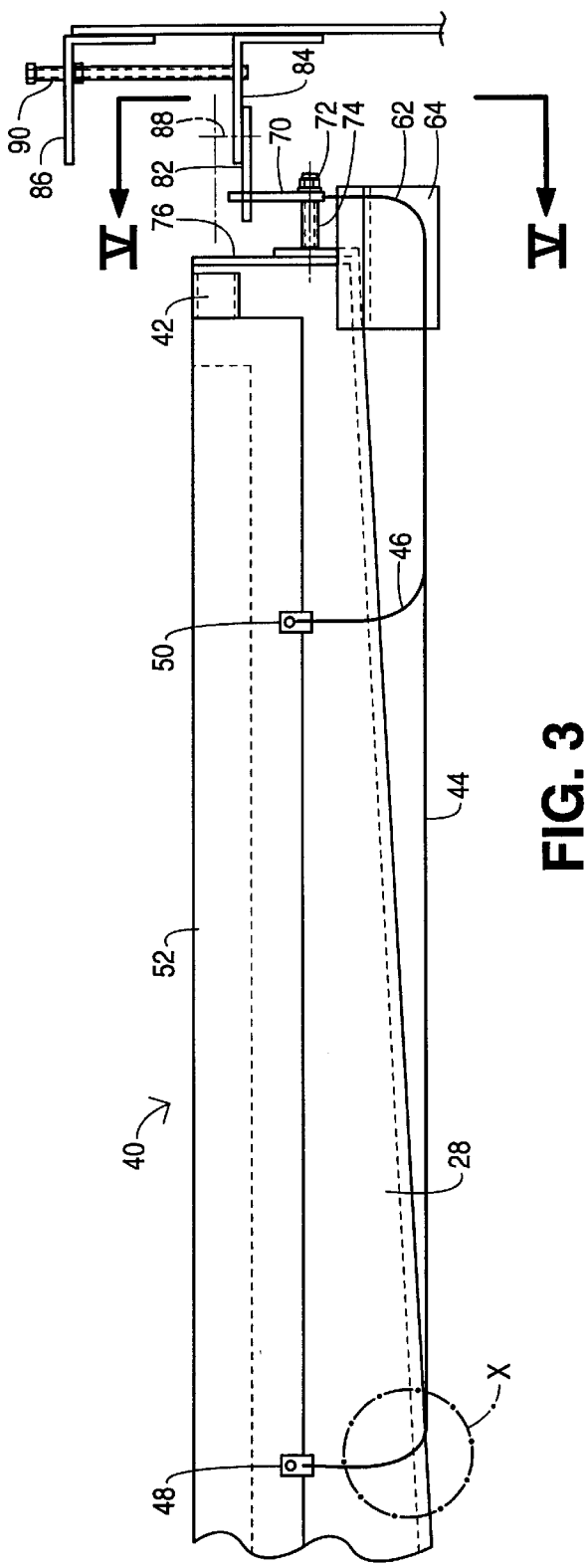
FIG. 3 is a partial front elevational view, on a larger scale, of a floating weir of the scum removal system of FIG. 2, showing actuating cables and the scum trough of FIG. 2.
Figure 4:
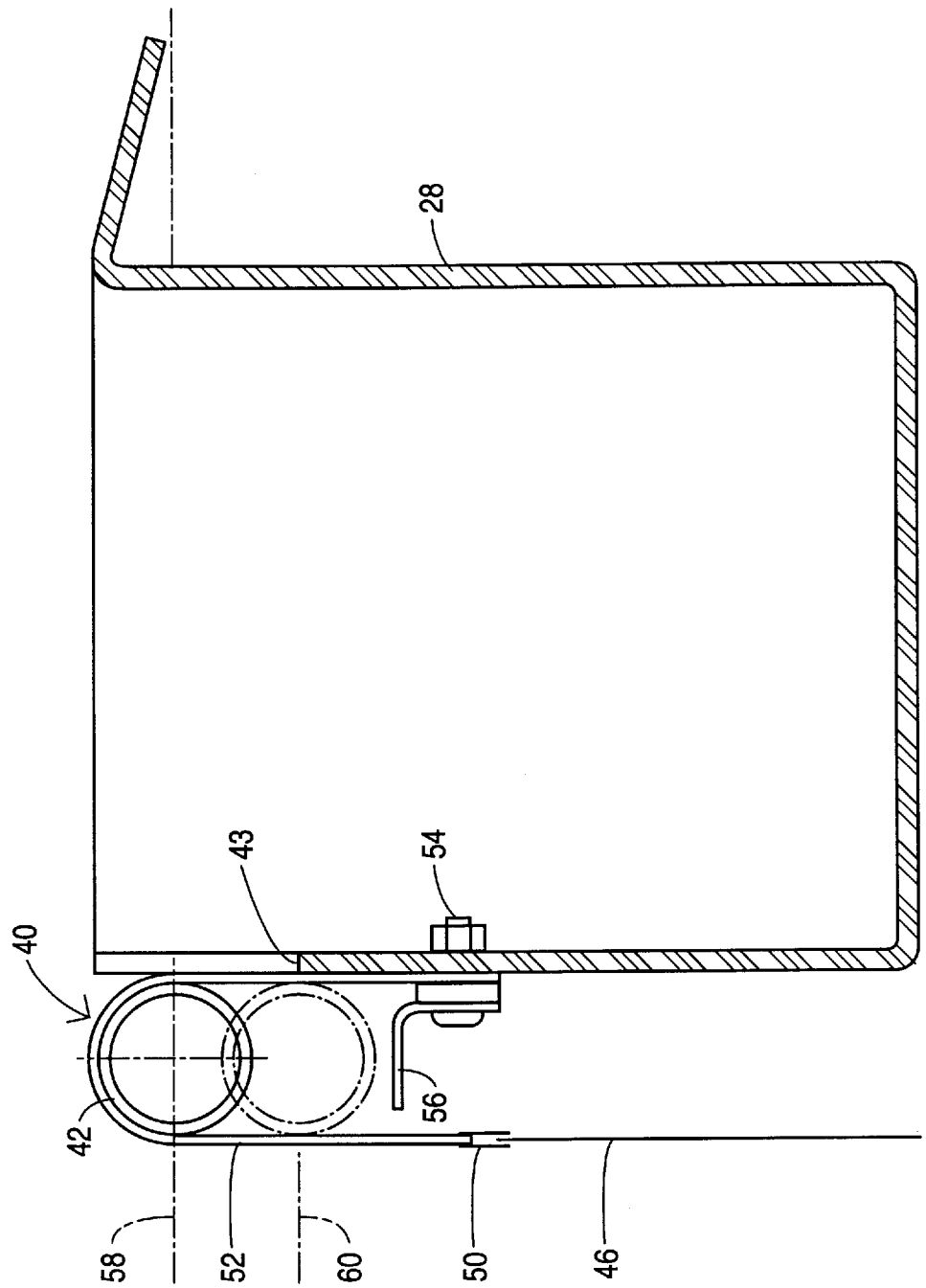
FIG. 4 is a transverse cross-sectional view through the scum trough of FIG. 2 on an even larger scale, showing the floating weir and an actuating cable.

As shown in FIGS. 3 and 4, a floating weir 40 including a hollow cylinder 42 is provided along a mouth or rim 43 of scum trough 28 for selectively blocking liquid in the clarification tank 10 from spilling over into trough 28 except during a dipping cycle wherein weir 40 is pulled below the surface of the liquid by a tension cable 44 and a stainless steel cable extension or auxiliary cable 46. Cables 44 and 46 are fastened at connectors 48 and 50 to a flexible sheet or membrane 52 which partially surrounds weir cylinder 42 and is disposed in contact therewith. Sheet 52 is fastened along an edge opposite connectors 48 and 50 to mouth or rim 43 of scum trough 28. Bolts 54 which fasten sheet 52 to trough 28 also serve to mount one or more angle stops 56 to the trough to define a lowermost position for weir 40 and particularly cylinder 42. FIG. 4 shows variation in the rest or blocking position of weir 40 at a high liquid level 58 and a low liquid level 60.

Figure 7:
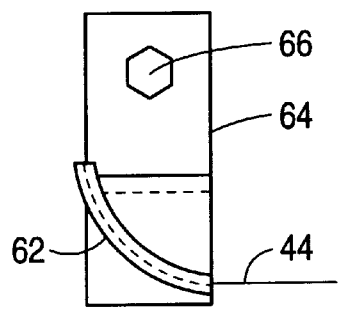
FIG. 7 is a front elevational view of a cable guide provided at reference numeral X in FIG. 3 in the scum removal system of the present invention

Cable extension 46 is connected to main cable 44. These cables are disposed along generally U-shaped paths defined along curves by respective elbow type tubes 62 (FIG. 7). Tubes 62 are welded to respective mounting brackets 64 in turn fixed via bolts 66 (FIGS. 5 and 7) to trough 28. Bolts 66 may be the same as bolts 54 (see FIG. 4).

Figure 5:
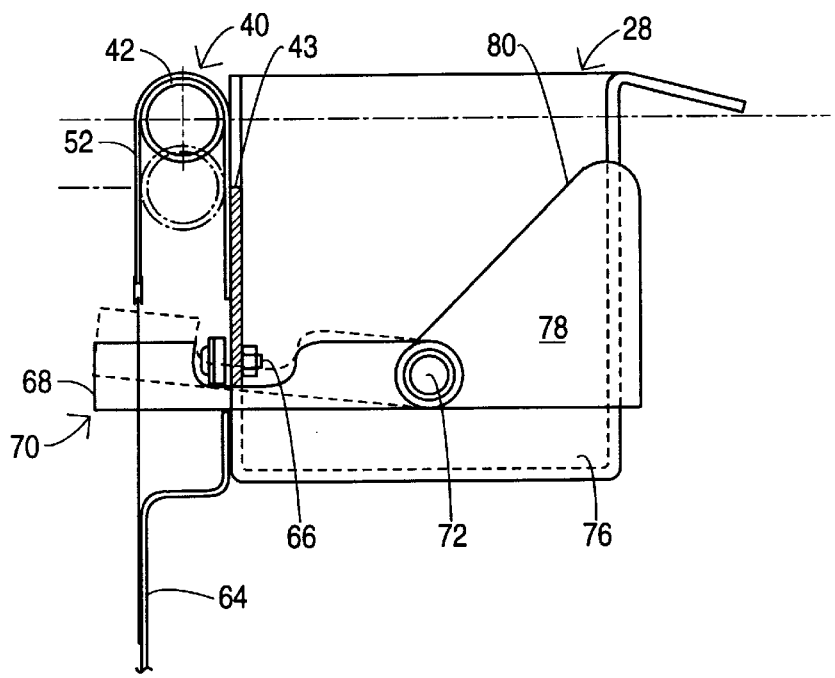
FIG. 5 is a side elevational view taken in the direction of arrows V—V in FIG. 3, showing, on a reduced scale, the scum trough, the floating weir and a lever or actuator arm shown in FIG. 3.

Cable 44 is connected to one end 68 of a lever or actuator arm 70 illustrated in FIGS. 2, 3, and 5. Lever or actuator arm 70, which forms a part of a weir height control assembly of the scum removal system, is swingably fastened via a pivot pin 72 and spacer 74 to an inwardly facing panel 76 of trough 28. As shown in FIG. 5, lever or actuator arm 70 includes, on a side of pivot pin 72 opposite the connection point of cable 44, an arm portion 78 which is weighted to act as a counterweight to ensure a minimum tension is applied to cable 44 (and 46) at all times, particularly when weir 40 is located in an uppermost position.

Figure 6:
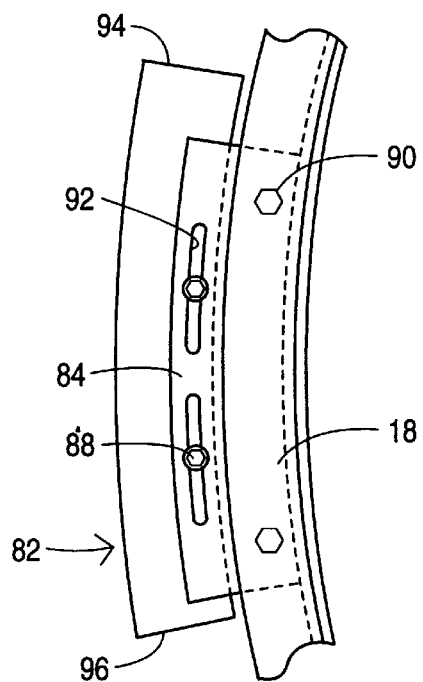
FIG. 6 is a top plan view of an adjustable actuator plate disposed on the feedwell of FIG. 1.

Counterweight portion 78 of lever or actuator arm 70 has a camming surface 80 which is engaged by an actuator plate 82 (FIGS. 2, 3, and 6) during a weir dipping cycle. Plate 82, also part of the weir height control assembly, is adjustably attached to feedwell 18 via an angle bracket 84 and bolts 88 and 90. Bolts 88 extend through slots 92 in bracket 84 and enable an adjustment in the starting and ending times of the dipping cycle: by moving actuator plate 82 forwards or backwards along feedwell 18, the starting and ending times of the dipping cycle are advanced or retarded. Also, the depth of weir displacement during the dipping cycle may be varied by turning bolts 90 to adjust the vertical position of bracket 84 and thus actuator plate 82 along feedwell 18. The higher the position of actuator plate 82, the less the maximum downward displacement of weir 40 during the dipping cycle. Also, it is contemplated that bracket 84 and accordingly actuator plate 82 can assume an angle with respect to the horizontal, for purposes of varying the downward displacement of weir 40 during the dipping cycle. Thus, if a leading edge 94 of actuator plate 82 is higher than a trailing edge 96 of the plate, then weir 40 is pulled downward slowly at first and then a greater amount towards the end of a dipping cycle when the layer of scum is thicker owing to travel of skimmer arm 16 (FIGS. 1 and 2).

Figure 8:
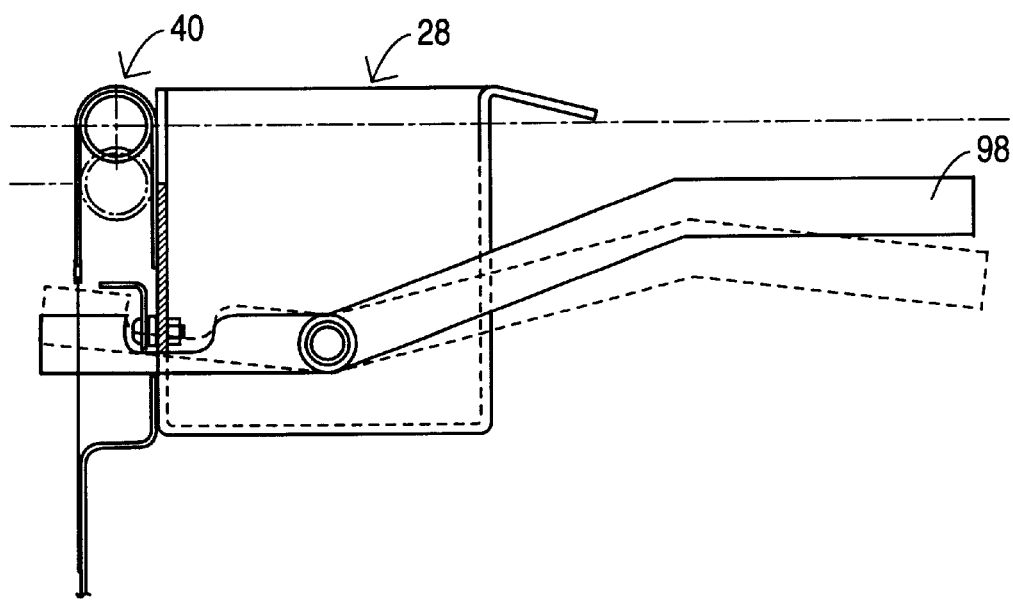
FIG. 8 is a side elevational view, similar to FIG. 5, showing a modified lever or actuator arm.

FIG. 8 shows a modified lever or actuator arm 98 wherein the balancing or tensioning function of counterweight portion 78 (FIG. 5) is achieved by extending arm 98 as illustrated.

Figure 9:
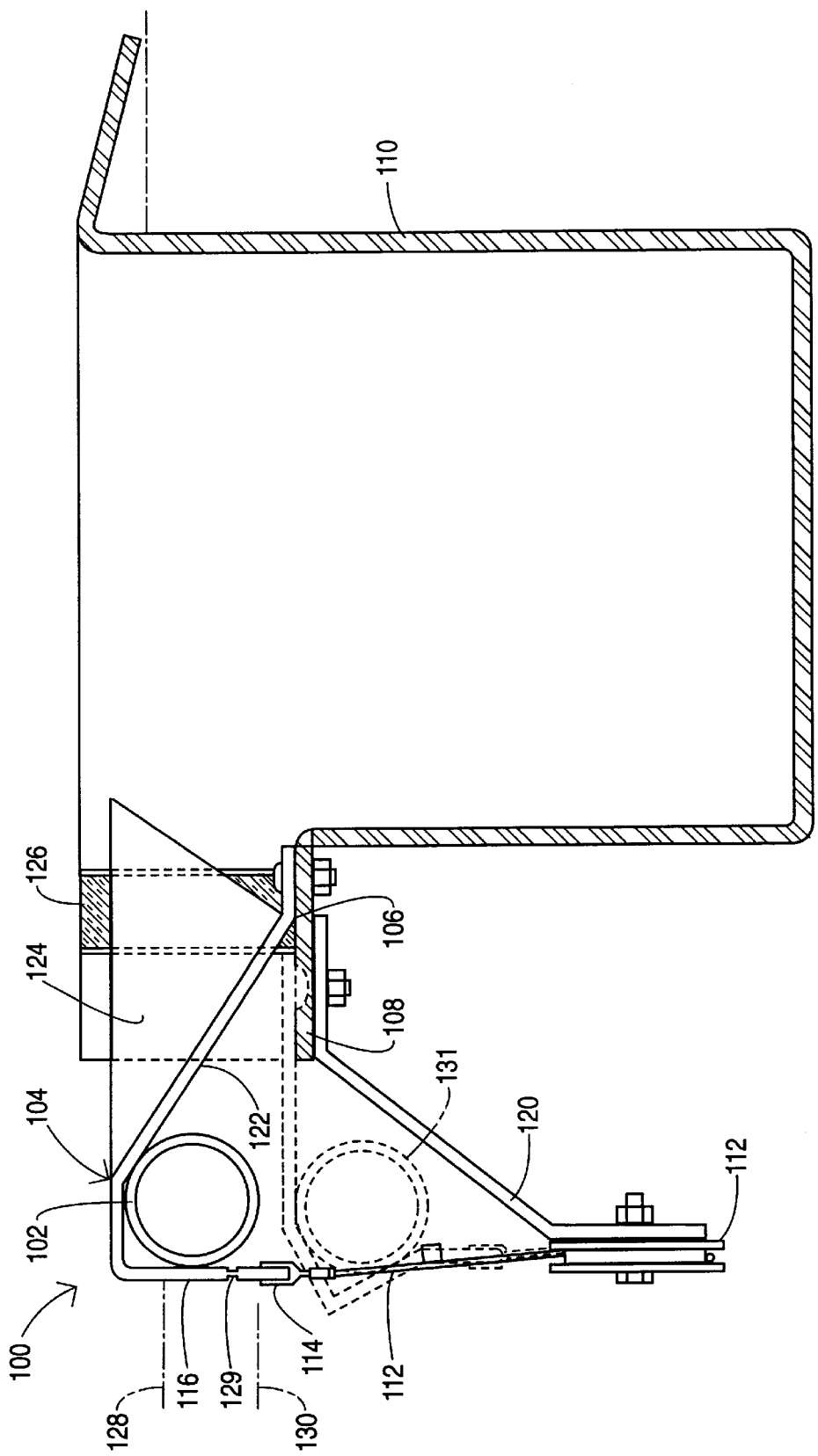
FIG. 9 is a transverse cross-sectional view, similar to FIG. 4, showing a modified floating weir and cable system in accordance with the present invention.

As depicted in FIG. 9, an alternative weir 100 in a scum removal system includes a floating cylinder 102 disposed in a crook of a substantially rigid inverted channel member 104. Channel member 104 is hinged at 106 to a flange 108 of a scum trough 110. A tension cable or cables 112 are coupled via links 114 to a downwardly depending leg 116 of channel member 104. Cables 112 are would around pulleys 118 which are rotatably mounted via respective pulley supports 120 to flange 108. Opposite sides of another leg 122 of channel member 104 are provided with respective upstanding side panels 124 (only one shown). Panels 124 are disposed in sealing engagement with closed foam seals 126 to prevent the flowing of liquid and surface scum into trough 110 around weir 100 when the weir is in a raised position. Dot-dash lines 128 and 130 indicate upper and lower operating limits for the liquid level in the clarification tank in which the scum removing assembly of FIG. 9 is located. Phantom lines 131 represent a configuration of weir 100 in a lowered position thereof. Leg 116 of channel member 104 is provided with a hinge joint 129 for facilitating the assumption of the lowered configuration 131 by weir 100.

Figure 10:
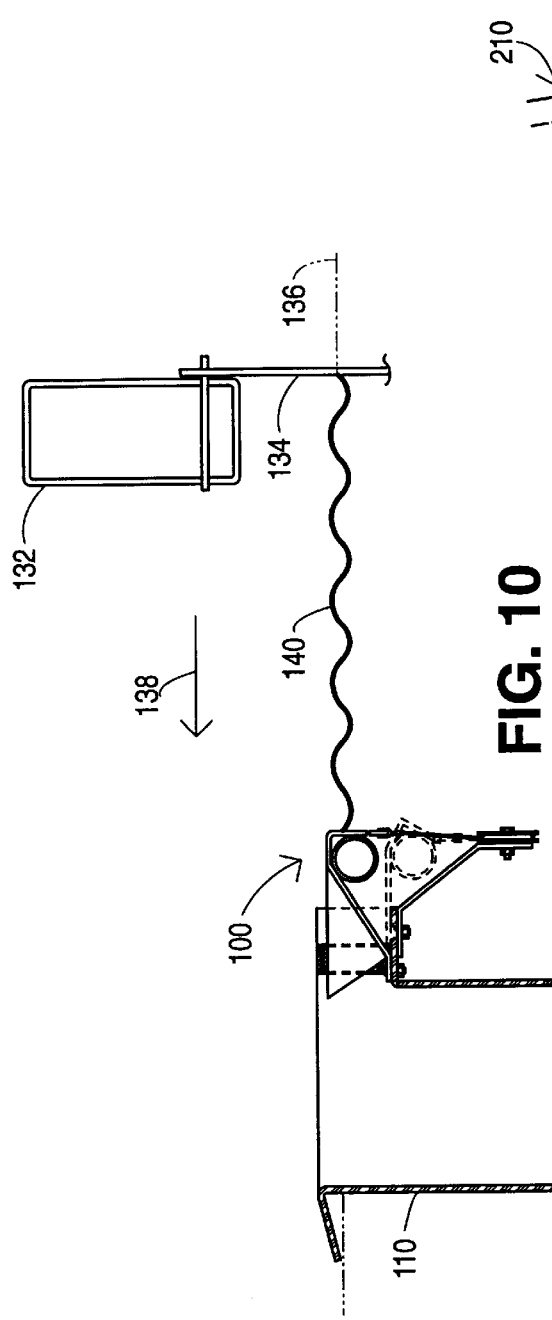
FIG. 10 is a schematic side view showing the modified system of FIG. 9 in use during a scum removal operation.

FIG. 10 illustrates a step in the use of the scum removing assembly of FIG. 9. A skimmer arm 132 carries a wiper 134 which extends downwardly past a liquid level or surface 136. During rotation of the skimmer arm about a vertical axis (not indicated) in a direction 138, wiper 134 traps a layer of surface scum 140 between weir 100 and the wiper. Upon a lowering of the weir by an actuator arm (see 70 and 98 in FIGS. 5 and 8, respectively), the trapped surface scum falls into trough 110.

Figure 11:
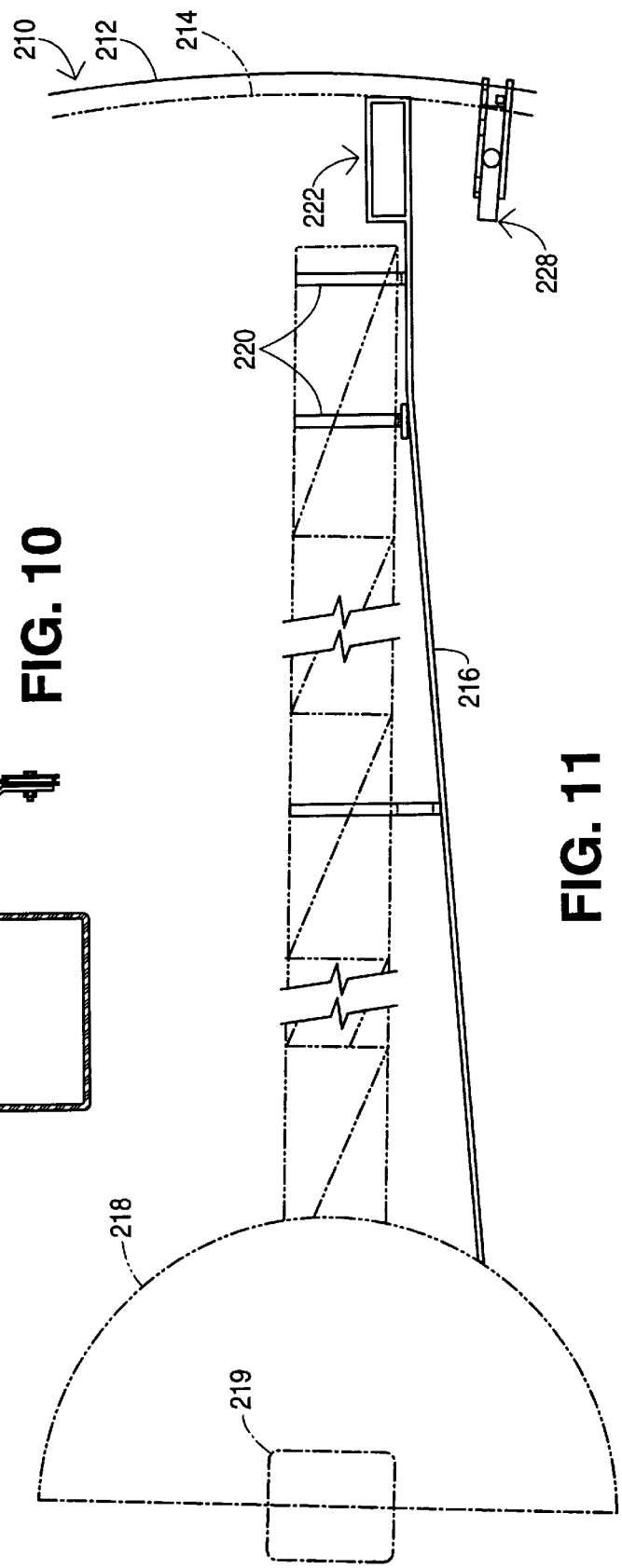
FIG. 11 is a partial top view of a feedwell and a skimmer arm or flight in a clarification tank having a modified scum removal system in accordance with the present invention, showing a sum trough or box and a skimmer shoe.

FIG. 11 depicts another cylindrical clarification tank 210 for the treatment of waste water or other solids-containing liquid. Tank 210 has an outer tank wall 212, an inside baffle 214, and a scum removal system which includes a skimmer wiper arm 216. Skimmer arm 216 is mounted to a feedwell 218 and a drive cage 219 thereof via a trusswork skimmer support 220. At an outer end, skimmer arm 216 is provided with a skimmer shoe 222 which comprises, as shown in FIGS. 12 and 13, a side wiper 223 and a rear wiper 224 which, together with baffle 214, define a rectangular scum pocket 225. Scum pocket 225 collects surface scum during rotation of skimmer arm 216 about a vertical axis 227 (FIG. 14) of feedwell 218.

Figure 15:
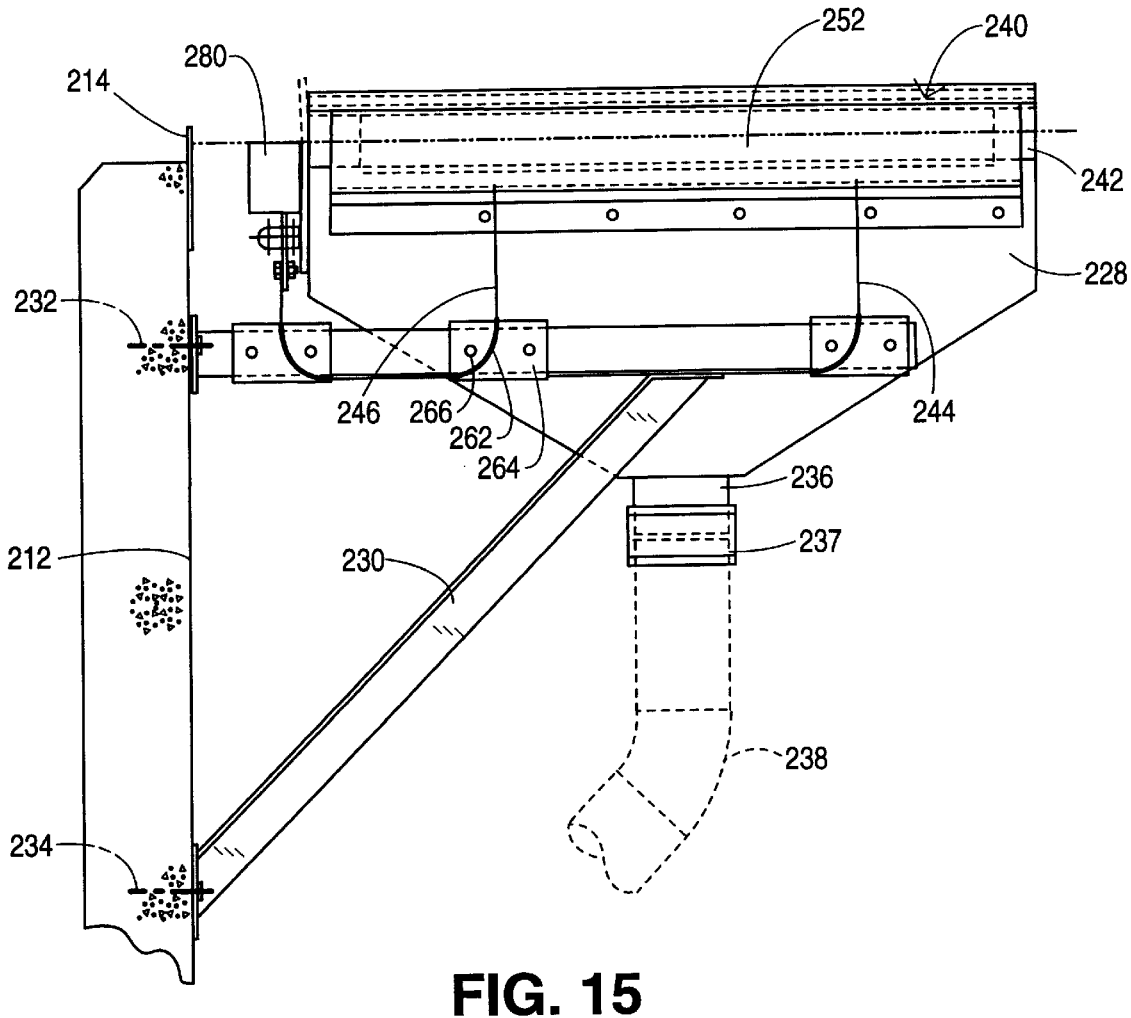
FIG. 15 is a front elevational view of the scum trough of FIGS. 11 and 14.
Figure 16:
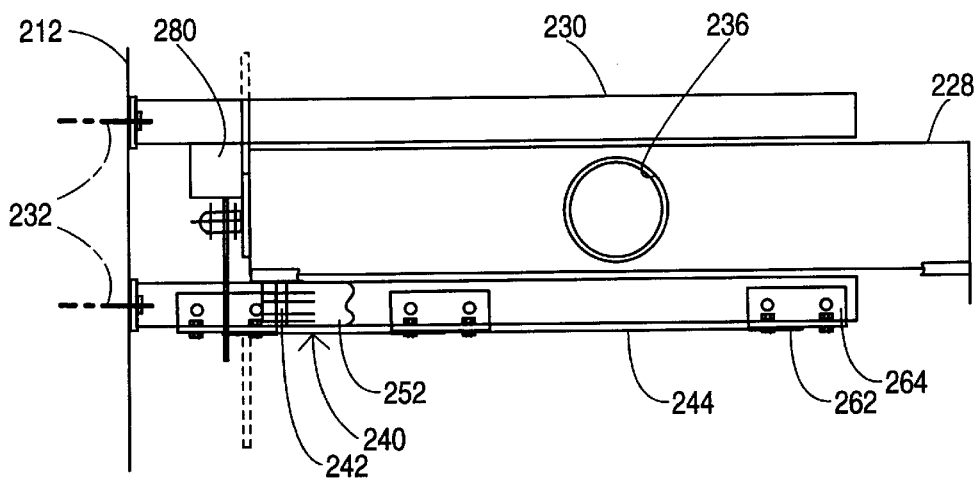
FIG. 16 is a top plan view of the scum trough of FIGS. 11, 14, and 15.

As illustrated in FIGS. 11 and 14, a scum trough or box 228 extends radially inwardly from baffle 214 and is supported thereon via a pair of bracket arms or braces 230 mounted to outer wall 212. As shown in FIGS. 15 and 16, bracket arms 230 are connected to outer wall 212 via expansion anchors 232 and 234. Trough 228 forms part of the scum removal system and is provided at the bottom with a scum pipe port or connector 236 and a coupling 237 for attaching the pipe port or connector 236 to a pipe 238. Trough 228 communicates with an external launder (not shown) via port 236 and pipe 238.

Figure 17:
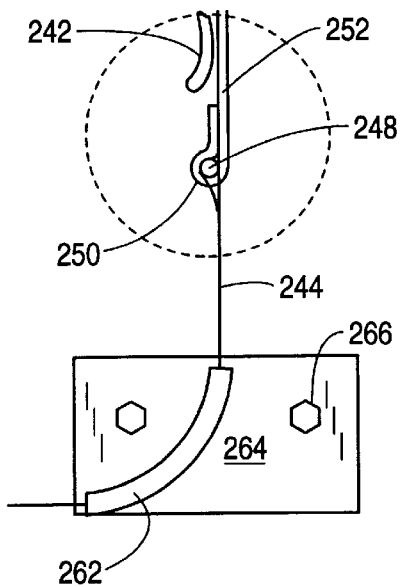
FIG. 17 is a front elevational view of a cable guide and a partial side elevational view (in dashed circle) of a floating weir and membrane of the modified scum removal system of FIG. 11 et seq.

As further shown in FIGS. 15 and 16, a floating weir 240 including a hollow cylinder 242 is provided along scum trough 228 for selectively blocking liquid in the clarification tank from spilling over into trough 228 except during a dipping cycle wherein weir 240, particularly cylinder 242, is pulled below the surface of the liquid by a tension cable 244 and a cable extension or auxiliary cable 246. As shown in FIG. 17, cables 244 and 246 are fastened to a pull rod 248 which is inserted in an elongate loop 250 formed along one side or edge of a flexible sheet or membrane 252. Membrane 252 is partially wrapped or wound around weir cylinder 242 and is fastened along an edge opposite pull rod 248 and loop 250 to scum trough 228.

Cable extension 246 is connected to main cable 244. These cables are disposed along generally U-shaped paths defined along curves by respective elbow type tubes 262 (see FIGS. 15 and 17). Tubes 262 are welded to respective mounting brackets 264 in turn fixed via bolts 266 to trough 228.

Figure 18:
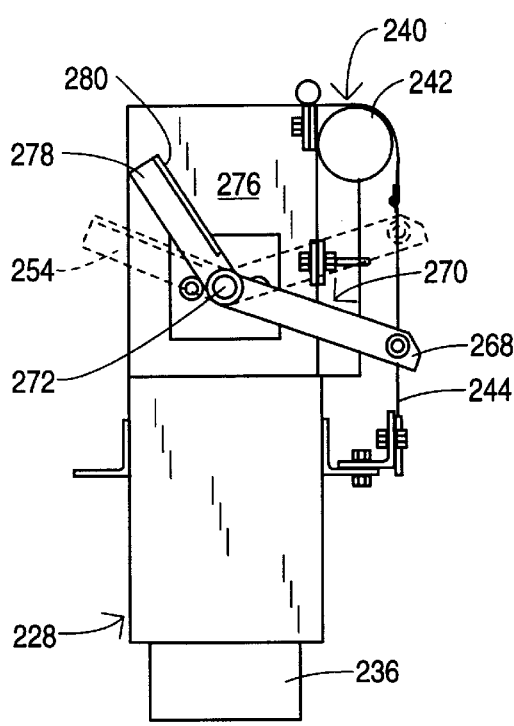
FIG. 18 is a side elevational view of a camming lever assembly included in the modified scum removal system of FIG. 11 et seq.
Figure 19:
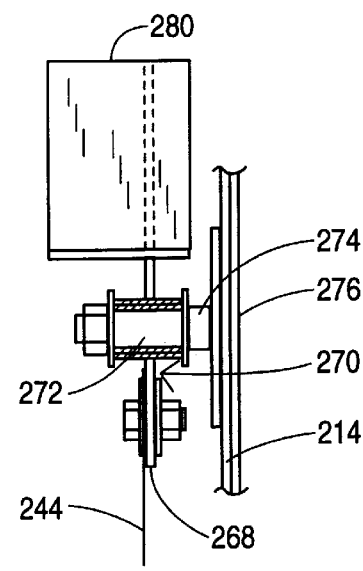
FIG. 19 is a front elevational view, on a larger scale, of the camming lever assembly included in the modified scum removal system of FIG. 11 et seq.

Cable 244 is connected to one end 268 of a lever or actuator arm 270 illustrated in FIGS. 15, 18, and 19. Lever or actuator arm 270, which forms a part of the scum removal system, is swingably fastened via a pivot pin 272 and a spacer 274 to baffle 214 and accordingly to an outwardly facing panel 276 of trough 228. Lever or actuator arm 270 includes, on a side of pivot pin 272 opposite the connection point of cable 244, an arm portion 278 which is weighted to act as a counterweight to ensure a minimum tension is applied to cable 244 (and 246) at all times, particularly when weir 240 is located in an uppermost position. Phantom lines 254 indicate a pivoted orientation of lever 270.

Counterweight portion 278 of lever or actuator arm 270 has a camming plate 280 which is engaged by an actuator plate 282 (FIGS. 12 and 13) during a weir dipping cycle. Actuator plate 282 is adjustably attached to skimmer wiper support 220 via a bracket 284 and bolts 288. Bolts 288 extend through slots 290 in bracket 284 and slots 292 in actuator plate 282 and enable an adjustment in the starting and ending times of the dipping cycle. Also, the depth of weir displacement during the dipping cycle may be varied by adjusting the vertical position of actuator plate 282 on skimmer shoe 222. The higher the position of actuator plate 282, the less the maximum downward displacement of weir 240 during the dipping cycle. Also, it is contemplated that actuator plate 282 can assume an angle with respect to the horizontal, for purposes of varying the downward displacement of weir 240 during the dipping cycle.

Although the invention has been described in terms of particular embodiments and applications, one of ordinary skill in the art, in light of this teaching, can generate additional embodiments and modifications without departing from the spirit of or exceeding the scope of the claimed invention. For example, the liquid treatment or clarification tank in which the scum box assembly of the present invention is disposed need not be a circular tank but may take the form of any basin or cell. In addition, the scum trough or box need not extend radially into the tank, but may instead be disposed along a edge or wall thereof. Mechanisms other than a camming arrangement may be used for exerting tension on the sheet or membrane for purposes of drawing the weir downwardly. For instance, a motorized assembly may be used.

Accordingly, it is to be understood that the drawings and descriptions herein are offered by way of example to facilitate comprehension of the invention and should not be construed to limit the scope thereof.

What is claimed is:

1. A liquid treatment system, comprising:
   a settling tank;
   a scum trough in said tank;
   a skimmer wiper arm movably disposed in said tank for sweeping scum toward said trough; and
   a weir disposed in said tank proximate to said scum trough, said weir having a changeable height for allowing surface scum to flow into said trough, said weir including a floating member and a membrane or sheet connected to said floating member, said membrane or sheet being wrapped at least partially about said floating member.

2. The system defined in claim 1 wherein said membrane or sheet has a first side fixed to said trough and an opposite side fastened to a tensioning device.

3. The system defined in claim 2 wherein said tensioning device includes at least one cable member connected to said membrane or sheet for pulling said membrane or sheet downward to lower said weir and thereby permit surface scum to enter said trough from said tank.

4. The system defined in claim 3 wherein said tensioning device further includes a camming lever operatively connected to said cable member and an actuator attached at least indirectly to said skimmer wiper arm.

5. The system defined in claim 4 wherein said skimmer wiper arm is attached to a feedwell disposed in said tank, said actuator being mounted to said feedwell so as to engage and pivot said camming lever about an axis.

6. The system defined in claim 4 wherein said camming lever is formed in part as a counterweight for maintaining cable tension when said weir is floating in place at a mouth of said trough.

7. The system defined in claim 1 wherein a weir height control assembly is operatively connected to said weir for changing the height thereof, said control assembly including a mechanism having an adjustable element for varying a characteristic of a dipping cycle, said characteristic being taken from the group consisting of (1) a duration of displacement of said weir during said dipping cycle, (2) a rate at which said weir is displaced during said dipping cycle, and (3) a depth to which said weir is moved during said dipping cycle.

8. The system defined in claim 7 wherein said mechanism is a camming mechanism and said adjustable element is a camming element.

9. The system defined in claim 8 wherein said camming element is one of a plurality of camming elements including a camming lever on said trough and further including an adjustable actuator mounted to said skimmer wiper arm to vary a duration of contact between said actuator and said camming lever, thereby varying said duration of displacement of said weir during said dipping cycle.

10. The system defined in claim 9 wherein said actuator is a plate having an adjustable angle of attachment to said skimmer wiper arm.

11. The system defined in claim 8 wherein said camming element includes an actuator adjustably mounted to said skimmer wiper arm to vary a depth to which said weir is moved during said dipping cycle.

12. The system defined in claim 7 wherein said adjustable element is one of a plurality of cooperating elements including a lever arm and an actuator adjustable to vary at least one of:
    a duration of contact between said actuator and said lever arm, thereby varying said duration of displacement of said weir during said dipping cycle; and
    said depth.

13. A scum collection assembly for use in a liquid treatment system, comprising:
    a scum trough disposable in a tank of the liquid treatment system;
    a floatable weir disposable in said tank proximate to said scum trough;
    a membrane or sheet having a first side connected to said trough, said membrane or sheet being partially windable about said weir, in contact with said weir; and
    a cable connected to a second side of said membrane or sheet for exerting tension on said membrane or sheet to effectuate a change in vertical position of said weir to allow surface scum to flow into said trough.

14. The assembly defined in claim 13, further comprising a camming lever mounted to said trough and operatively connected to said cable for exerting tension on said cable.

* * * * *